(12) United States Patent
Ramamurthy et al.

(10) Patent No.: US 9,185,584 B1
(45) Date of Patent: Nov. 10, 2015

(54) DUAL CONTROLLER FUNCTIONALITY IN A WIRELESS COMMUNICATION SYSTEM

(71) Applicant: Sprint Spectrum L.P., Overland Park, KS (US)

(72) Inventors: Suryanarayanan Ramamurthy, Olathe, KS (US); Saravana Velusamy, Olathe, KS (US); Deveshkumar Rai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 246 days.

(21) Appl. No.: 13/911,670

(22) Filed: Jun. 6, 2013

(51) Int. Cl.
*H04L 12/26* (2006.01)
*H04W 24/04* (2009.01)

(52) U.S. Cl.
CPC ..................................... *H04W 24/04* (2013.01)

(58) Field of Classification Search
None
See application file for complete search history.

(56) References Cited

U.S. PATENT DOCUMENTS

| 2012/0023360 A1* | 1/2012 | Chang et al. | 714/4.11 |
| 2013/0137469 A1* | 5/2013 | Schmidt et al. | 455/466 |
| 2013/0265884 A1* | 10/2013 | Brombal et al. | 370/242 |

* cited by examiner

*Primary Examiner* — Yemane Mesfin
*Assistant Examiner* — Jeff Banthrongsack (57) ABSTRACT

In normal operation, a primary signaling controller in a first RAN manages bearer connectivity and tracking area updates for a UE and further interfaces with a second RAN over a primary signaling interface to facilitate inter-RAN signaling related to transition of the UE from being served by the first RAN to being served by the second RAN, such as circuit-switched fallback signaling. Upon detecting failure of the primary signaling interface, the first RAN is dynamically reconfigured to have such inter-RAN signaling for the UE pass over a secondary signaling interface between the second RAN and a secondary signaling controller of the first RAN, while the primary signaling controller continues to manage bearer connectivity and tracking area updates for the UE.

20 Claims, 4 Drawing Sheets

DUAL CONTROLLER FUNCTIONALITY IN A WIRELESS COMMUNICATION SYSTEM

BACKGROUND

Unless otherwise indicated herein, the materials described in this section are not prior art to the claims and are not admitted to be prior art by inclusion in this section.

A radio access network (RAN) may include a number of base stations that radiate to define wireless coverage areas, such as cells and cell sectors, in which user equipment devices (UEs) such as cell phones, tablet computers, tracking devices, embedded wireless modules, and other wirelessly equipped communication devices, can operate. Further, each base station may include or be coupled with network infrastructure that provides connectivity with one or more transport networks, such as the Internet and/or the public switched telephone network (PSTN) for instance. With this arrangement, a UE within coverage of the RAN may engage in air interface communication with a base station and may thereby communicate via the base station with various entities on a transport network and/or with other UEs served by the RAN.

In general, the network infrastructure in such a RAN may include a switch or gateway system that physically connects with one or more transport networks. Further, the network infrastructure may include a controller, integrated with or separate from the switch or gateway system, that manages various RAN functions such as registration and tracking of UEs in the RAN and setup and control of bearer connections for UEs.

For instance, when a UE begins operating in coverage of the RAN, the controller may receive from the UE a registration or "attach" request, and the controller may responsively trigger authentication of the UE and obtain and store a service profile record for the UE. In turn, as the UE moves throughout the RAN, the controller may receive tracking area updates from the UE and may process those updates to record where in the RAN the UE is located, so as to facilitate paging the UE or the like.

Further, when a UE is served by a particular base station, the controller may engage in signaling with the base station and with the switch or gateway system to set up one or more bearer connections for carrying communication traffic between the UE and the switch or gateway system, and thus between the UE and one or more transport networks. And the controller may manage each such bearer connection, including maintaining context data for the bearer connection, engaging in signaling to suspend, resume, release, or transfer the connection between base stations, and so forth.

In addition, such a controller in one RAN may have a signaling interface with another RAN, through which to engage in signaling to facilitate transition of a UE to be served with communications by the other RAN. For instance, a first RAN may primarily serve UEs with packet-data communication service, a second RAN may primarily serve UEs with PSTN voice call communication service, and the first RAN may include a controller that has a signaling interface for engaging in signaling with the second RAN. In a "circuit-switched fallback" (CSFB) arrangement, when a UE is being served by the first RAN and the UE seeks to place a PSTN voice call, or the second RAN seeks to connect a PSTN voice call to the UE, the second RAN may engage in call setup signaling with the UE through the controller of the first RAN.

For instance, the UE may transmit via its serving base station to the controller a PSTN voice call origination request, and the controller may send that request to an interworking server (IWS) of the second RAN, which may pass the request to a controller of the second RAN. The controller of the second RAN may then work to set up the requested PSTN voice call, and may engage in further signaling with the UE via the controller of the first RAN. Alternatively, a controller of the second RAN may transmit to the UE via the controller of the first RAN a page message to alert the UE of an incoming PSTN voice call. In either case, as a result of the inter-RAN signaling, the UE may then ultimately transition from being served by the first RAN to being served by the second RAN so as to engage in the PSTN voice call served by the second RAN.

When a UE engages in such a transition, the controller of the first RAN, as manager of bearer connections for the UE in the first RAN, may suspend one or more bearer connections that were in place for the UE in the first RAN, pending return of the UE to be served by the first RAN. Upon completion of the PSTN voice call, the UE may then return to be served by the first RAN, and the controller of the first RAN may resume the suspended bearer connection(s), to enable the UE to engage in further packet-data communication served by the first RAN.

OVERVIEW

Unfortunately, a problem can arise in the arrangement described above, where the signaling interface that carries signaling between the controller of the first RAN and an IWS or other entity of the second RAN may fail. Such a failure can occur in various ways. For example, one or more routers, switches, gateways, or other nodes between the controller of the first RAN and the second RAN may stop working or may experience other problems routing signaling. As another example, a physical transmission line between the controller and the second RAN could be cut or otherwise damaged. And as still another example, certain network interface components of the controller and/or IWS may themselves stop working or become unable to engage in signaling communication with the other endpoint.

When the signaling interface between the controller of the first RAN and the second RAN fails, a UE served by the first RAN may be unable to engage in CSFB as discussed above. In particular, when the UE sends to the controller a PSTN voice call origination request, the controller may be unable to pass that origination request along to the second RAN, so the PSTN voice call would not be set up. Likewise, when the second RAN has a voice call to set up to the UE served by the first RAN, the second RAN may be unable to send a page message to the controller of the first RAN, so paging of the UE for the incoming call would fail.

As a result of this problem, when a UE served by the first RAN seeks to engage in a PSTN voice call, the UE may instead transition directly to be served by the second RAN and may originate the call directly to the second RAN, rather than originating the call through the first RAN. Such an arrangement, however, would defeat a primary purpose of CSFB and may prevent the UE from being served by the first RAN for quite some time, even after the call ends.

One way to overcome this problem is to detect the failure of the signaling interface between the controller and the second RAN and to responsively reconfigure the first RAN to make use of a different controller that may have a working signaling interface with the second RAN. Unfortunately, however, such a dynamic reconfiguration could be fairly complex. In practice, for instance, the controller may already have authenticated a UE and obtained and stored a service profile for the UE, the controller may have already engaged in signaling with a base station and the gateway system to set up one or more bearer connections for the UE and may maintain and manage state of the bearer connection(s), the controller may manage tracking area updates for the UE, and a switch or gateway system may be arranged to signal to the controller to trigger paging of the UE when bearer data arrives for the UE. Reconfiguring the first RAN to use a different controller altogether could take a significant amount of signaling and processing.

Disclosed herein is an improved method and corresponding system to help overcome this problem. In accordance with the disclosure, in response to detecting failure of the signaling interface between the controller of the first RAN and the second RAN, the first RAN will be dynamically reconfigured to make use of a secondary controller for signaling with the second RAN to support CSFB functionality for a UE but will maintain use of the existing controller to manage bearer connectivity, tracking area updates, and the like for the UE. In particular, the existing controller may detect the failure of the signaling interface with the second RAN and may responsively signal to the base station serving the UE to direct the base station (i) to send to the existing controller any signaling from the UE related to bearer connectivity or tracking area update but (ii) to send to the secondary controller any inter-RAN signaling from the UE related to transition of the UE from being served by the first RAN to being served by the second RAN, such as CSFB call origination signaling for instance.

Accordingly, in one respect, disclosed is a method that involves a first RAN serving a UE, where the first RAN includes a primary controller and a secondary controller, the primary controller manages bearer connectivity and tracking area updates for the UE in the first RAN and the primary controller has a primary signaling interface with a second RAN, the secondary controller has a secondary signaling interface with the second RAN, and the first RAN has a first mode of operation in which inter-RAN signaling to facilitate transition of the UE from being served by the first RAN to being served by the second RAN passes over the primary signaling interface between the primary controller and the second RAN.

The method then involves detecting failure of the primary signaling interface and, responsive to detecting the failure, transitioning from the first mode of operation to a second mode of operation in which the inter-RAN signaling to facilitate transition of the UE from being served by the first RAN to being served by the second RAN instead passes over the secondary signaling interface between the secondary controller and the second RAN, but the primary controller still manages bearer connectivity and tracking area updates for the UE in the first RAN.

In another respect, disclosed is then a first RAN including a primary controller and a secondary controller. The primary controller is configured to manage bearer connectivity and tracking area updates in the first RAN for a UE served by the first RAN. Further, the primary controller has a primary signaling interface with a second RAN, and the first RAN is configured to have the primary controller communicate with the second RAN, over the primary signaling interface, communication-setup signaling that is passing between the second RAN and the UE served by the first RAN in preparation for transition of the UE from being served by the first RAN to being served with a communication by the second RAN. And the secondary controller having a secondary signaling interface with the second RAN.

In practice, the primary controller is then further configured to detect failure of the primary signaling interface and, in response to detecting the failure, to reconfigure the first RAN (i) to have the secondary controller communicate the communication-setup signaling over the secondary signaling interface with the second RAN, instead of having the primary controller communicate the communication-setup signaling over the primary signaling interface with the second RAN, but (ii) to have the primary controller continue to manage bearer connectivity and tracking area updates in the first RAN for the UE served by the first RAN.

Still further, in another respect, disclosed is a method operable in a communication system that includes a Long Term Evolution (LTE) network having a primary mobility management entity (MME) that manages bearer connectivity and tracking area updates for a UE served by the LTE network and that functions to pass CSFB signaling between the UE and an IWS of a fallback network over a primary interface (e.g., a primary S102 interface) between the primary MME and the IWS. In that context, the method may involve detecting failure of the primary interface and, responsive to detecting the failure, reconfiguring the wireless communication system so that the primary MME still manages bearer connectivity and tracking area updates for the UE served by the LTE network but a secondary MME instead functions to pass CSFB signaling between the UE and the IWS over a secondary interface (e.g., a secondary S102 interface) between the secondary MME and the IWS.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and corresponding system will be described in the context of an LTE network that functions primary to provide UEs with wireless packet-data connectivity and that interfaces with a fallback 3G network, such a Code Division Multiple Access (CDMA) or Global System for Mobile Communications (GSM) network for instance, that functions to provide PSTN voice call connectivity. Principles of the method and system are not limited to this specific arrangement, however, and could thus apply in other contexts, with respect to networks of other types, functions, and configurations.

Figure 1:
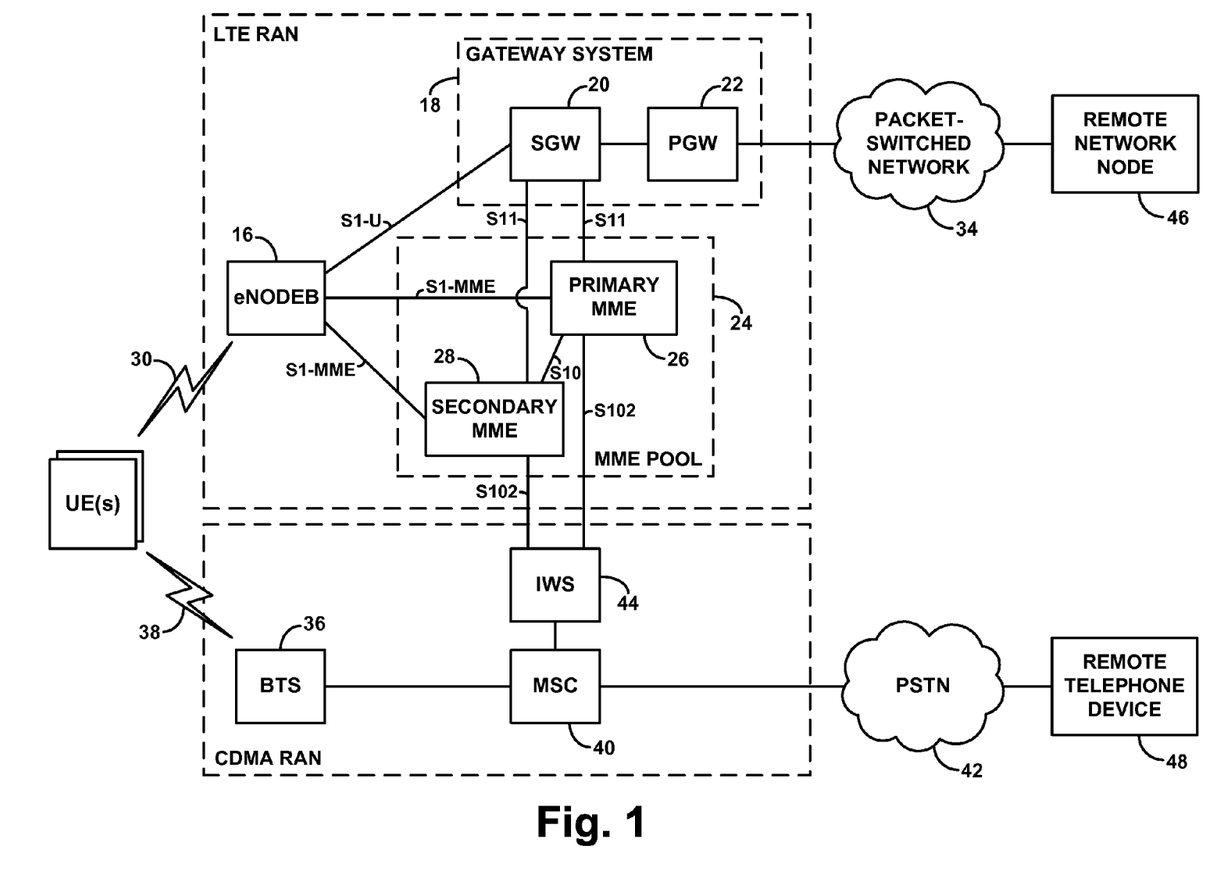
FIG. 1 is a simplified block diagram of an example network arrangement in which aspects of the present disclosure can be implemented.

FIG. 1 is thus a simplified block diagram of representative network arrangement in which aspects of the present method can be implemented. In particular, the representative arrangement includes an LTE RAN 12 that primarily serves UEs with wireless packet data communication service (but may also provide voice call service), and a CDM RAN 14 that primary serves UEs with circuit-switched voice call service (but may also provide packet-data service).

The LTE RAN 12 is shown including a representative LTE base station 16 known as an eNodeB, a gateway system 18 including a serving gateway (SGW) 20 and a packet data network (PDN) gateway (PGW) 22, and a pool of MMEs 24 including by way of example a primary MME 26 and a secondary MME 28. In practice, the eNodeB 16 includes an antenna structure and associated equipment for engaging in LTE communication over an air interface 30 with UEs 32, and the PGW 22 provides connectivity with a packet-switched network 34 such as the Internet. Further, the eNodeB communicates with the SGW over an S1-U interface, the eNodeB communicates with each of the MMEs over a respective S1-MME interface, each MME communicates with the SGW over a respective S11 interface, and the MMEs of the pool communicate with each other over respective S10 interfaces. Although each of these interfaces is shown as a direct link in the figure, in practice the various elements of the LTE RAN may sit as nodes on a wireless carrier's core packet network, and so these and other interfaces described herein may instead be logical connections over that packet network.

The CDMA RAN 14, on the other hand, includes a representative CDMA base station 36 known as a base transceiver station (BTS), which includes an antenna structure and associated equipment for engaging in CDMA communication over an air interface 38 with UEs. The BTS then has a communication interface (possibly through a base station controller (BSC) (not shown)) with a mobile switching center (MSC) 40 that functions to manage call setup for UEs and to provide connectivity with a PSTN 42. Further, the example network arrangement includes an IWS 44 that functions to facilitate interworking between the LTE RAN 12 and the CDMA RAN 14 as discussed above, so as to facilitate CSFB functionality for instance. In practice, the IWS may be a function of the MSC 40 or other element of the network or may be a standalone server. As shown, each of the MMEs of pool 24 communicates with the IWS over a respective S102 interface, which again may be a direct link or may extend over a core packet network for instance, to facilitate signaling between the LTE RAN and the CDMA RAN.

In practice, when a UE enters into coverage of the LTE eNodeB 16, the UE may register or "attach" with the LTE RAN 12 by transmitting an attach request to the eNodeB, which the eNodeB would forward to the primary MME 26. The primary MME may then carry out various functions to facilitate serving of the UE.

By way of example, when the UE first attaches, the primary MME may engage in signaling with a home subscriber server (HSS) to authenticate the UE for service in the LTE RAN. In that process, the primary MME may receive from the HSS a service profile record specifying various service authorizations for the UE, and the primary MME may store that service profile record in data storage for later reference in serving the UE.

As another example, the primary MME may engage in signaling with the gateway system and with the eNodeB in order to set up and manage one or more bearer connections extending between the UE and the PGW and thus between the UE and the packet-switched network 34. For instance, for each such bearer connection, the primary MME may create and store in data storage a context record defining an evolved packet system (EPS) bearer identity for the WCD, and the primary MME may generate and transmit to the SGW a create-session request identifying the serving eNodeB and triggering setup of a tunnel between the SGW and PGW and assignment of an Internet Protocol (IP) address for the UE. Further, upon receipt of a create-session response from the SGW, the primary MME may then further generate and transmit to the eNodeB an attach-accept message identifying the SGW and triggering setup of a tunnel between the eNodeB and the SGW and assignment of a corresponding radio bearer identity defining a tunnel between the UE and the eNodeB. Thus, the primary MME would essentially manage establishment of a bearer defining a series of tunnels extending (i) between the UE and the eNodeB, (ii) between the eNodeB and the SGW, and (iii) between the SGW and the PGW.

With each such bearer established, the UE may then engage in packet-switched communication on network 34, to communicate with a remote packet network node 46. Further, the primary MME may maintain the context record for each such bearer, to facilitate subsequent signaling related to the bearer, such as signaling to facilitate suspending, resuming, releasing or otherwise managing the bearer.

As still another example, the primary MME may function to page the UE when necessary. For example, the UE may from time to time operate in an idle mode in which the UE has a bearer but the eNodeB is not serving the UE with bearer communication over the air interface. In such a mode, when the SGW receives packet data destined to the UE, the SGW may signal to the primary MME to cause the primary MME to page the UE. The primary MME may then direct one or more eNodeBs to page the UE, and the UE may respond via a serving eNodeB to trigger transition of the UE from the idle mode into a connected mode, and the primary MME may the signal to the SGW to cause the SGW to transmit the received data to the eNodeB for transmission in turn to the UE.

And as still another example, the primary MME may manage tracking area updates from the UE to keep track of where in the LTE RAN the UE is operating, so as to facilitate targeted paging of the UE for instance. In particular, eNodeBs of the LTE RAN may be grouped into tracking areas each broadcasting a respective tracking area identifier, and when a UE moves into a new tracking area, the UE may send a tracking area update to the primary MME to notify the primary MME where the UE is located in the LTE RAN. The primary MME may then record that fact in a context or profile record for the UE, so that when the primary MME has a page message to send to the UE, the primary MME can direct eNodeBs of that tracking area to transmit the page message.

Similarly, in a basic CDMA arrangement, when a UE enters into coverage area of the CDMA BTS 36, the UE may register with the CDMA RAN by transmitting a registration message to the BTS, which the BTS may forward to the MSC. Once registered, the UE may then engage in call setup signaling over the CDMA air interface 38 with the CDMA RAN 14 to place or receive PSTN voice calls, so as to communicate with a remote telephone device 48 for instance. In particular, when the UE seeks to place a call on PSTN 42, the UE may conventionally transmit an origination request message over the air to the BTS, which would be forwarded to the MSC. The MSC may then set up the requested call for the UE and arrange for the BTS to assign a CDMA air interface traffic channel to carry the call, and the call may proceed. Likewise, when the MSC has a PSTN call to connect to a registered UE, the MSC may transmit to the BTS a page message, which the BTS may broadcast for receipt by the UE. When the UE receives and responds to the page message, the MSC may then similarly arrange assignment of a CDMA air interface traffic channel and connect the call through to the UE, and the call may proceed.

In a CSFB arrangement as noted above, when the UE is served by the LTE RAN (e.g., by eNodeB 16), at least a portion of such PSTN call setup signaling conveniently passes between the CDMA RAN 14 and the UE via the LTE RAN 12. To facilitate this, when the UE first attaches with the LTE RAN, the primary MME may further register the UE with the CDMA RAN, such as by transmitting a registration message to IWS and in turn to the MSC. The MSC and IWS would thereby have a record that the UE is serve by the LTE RAN and particularly that the primary MME of the LTE RAN is a signaling controller for the UE. Further or alternatively, subsequent CSFB signaling that the primary MME sends to the IWS for the UE may inform the IWS that the primary MME is functioning as signaling controller for the UE. In practice, the IWS may thus map the primary MME (e.g., IP address of the primary MME) to an identifier of the UE to facilitate later determining where to route CSFB signaling for the UE.

When the UE is served by the LTE RAN and seeks to place a call on PSTN 42, the UE may then conveniently transmit to the LTE eNodeB an extended call origination message, which the eNodeB would forward to the primary MME. The primary MME may then transmit that call origination message over the S102 interface from the primary MME to the IWS and thus to the CMDA RAN, and the IWS may pass the call origination message to the MSC. Similarly, when the MSC has an incoming call to connect to the UE, the MSC may transmit a page message to the IWS, and the IWS may forward the page message via the S102 interface to the primary MME as signaling controller for the UE. The primary MME may then transmit that page message to the UE over LTE, and upon receipt of a response from the UE may transmit the response to the IWS and in turn to the MSC. In either case, the MSC may then work to set up the requested call and arrange for assignment of a CDMA air interface traffic channel for the call, possibly transmitting a traffic channel assignment through the IWS and primary MME to the UE. And the UE may then transition to be served by the CDMA BTS and to engage in the call.

As noted above, a problem scenario arises when the S102 interface between the primary MME and the CDMA RAN fails. In particular, when that interface fails, a UE that is served by the LTE RAN may be unable to benefit from CSFB functionality, as PSTN call setup signaling may not pass successfully between the primary MME and the CDMA RAN. In that situation, in order to place a PSTN call, the UE may instead need to transition to CDMA coverage and originate the call directly there. Further, in order to receive a PSTN call, the UE may need to monitor for pages over the CDMA air interface. In either case, such an arrangement would be less desirable than the CSFB arrangement.

To help overcome this problem, as noted above, the present method provides for dynamically implementing the secondary MME 28 to support CSFB signaling for the UE while maintaining use of the primary MME 26 to support other cover LTE RAN functions for the UE such as management of bearer connectivity and tracking area updates.

In particular, the primary MME that functions as a signaling controller for the UE such as to manage bearer connectivity and tracking area updates will detect failure of communication with the IWS that would be necessary to facilitate CSFB or other such inter-RAN signaling. The primary MME may detect this failure in various ways. For instance, if the primary MME normally receives heartbeat messages and/or acknowledgements over its S102 interface from the IWS, the primary MME may detect a threshold absence of those heartbeat messages and/or acknowledgements (such as a threshold number of missing heartbeat messages or acknowledgements or threshold duration of no heartbeat messages or acknowledgements). Further, the primary MME may detect such a failure generally when not seeking to set up a CSFB call for the UE or may detect the failure during an effort to set up a CSFB call for the UE.

In response to detecting failure of the S102 interface between the primary MME and the IWS, the primary MME may then signal to at least one eNodeB under its control, such a eNodeB 16 serving the UE, to cause the eNodeB to instead use secondary MME 28 for CSFB signaling but to continue using the primary MME for other purposes such as a management of bearers and tracking area updates. (In practice, the primary MME may select the secondary MME from among multiple possible secondary MMEs after first querying the secondary MME over an S10 interface to ensure that the secondary MME has working S102 interface with the IWS.)

For instance, when the primary MME receives an extended call origination request from a UE via a particular eNodeB and determines that its S102 interface with the IWS is not working, the primary MME may send the extended call origination request back to the eNodeB with a directive for the eNodeB to send it instead to the secondary MME, and the eNodeB may responsively do so. Alternatively or additionally, upon detecting failure of the S102 interface between the primary MME and the IWS, before or at the time a UE seeks to engage in CSFB call setup signaling, the primary MME may transmit to the eNodeB a directive for the eNodeB (i) to transmit to the secondary eNodeB any CSFB signaling or other such inter-RAN signaling from the UE, but (ii) to transmit to the primary MME any other MME-destined signaling from the UE such a signaling related to management of bearers or tracking area updates. In practice, for instance, the primary MME may transmit such a directive to the eNodeB over its S1-MME interface with the eNodeB, using a signaling message newly defined for that purpose, to which the eNodeB would be programmed to respond accordingly.

Normally, if an MME receives an extended service request message or the like from a UE and does not have a record indicating that the UE is authenticated, the MME may force the UE to detach and re-attach so as to authenticate the UE. However, in this instance, the secondary MME 28 need not do that, since the UE is already authenticated by the primary MME. To avoid the normal process of detaching and re-attaching, the eNodeB may include in the CSFB signaling that it passes to the secondary MME a special code or other data that the secondary MME would be programmed to interpret as an indication that the secondary MME does not need to authenticate the MME. The code or other data may have been provided to the eNodeB by the primary MME for instance, when the primary MME directed the eNodeB to use the secondary MME for CSFB signaling. Alternatively or additionally, CSFB signaling from the eNodeB to the secondary MME may carry an identification or address of the primary MME, in which case the secondary MME may read the signaling to identify the primary MME and may query the primary MME over an S10 interface to verify authentication of the UE before proceeding. Still alternatively, the primary MME may signal directly to the secondary MME over an S10 interface to notify the secondary MME that the UE is already authenticated and/or otherwise to allow CSFB setup without requiring re-attachment and re-authentication of the UE.

The secondary MME will then proceed to function as the MME for the UE for purposes of setting up CSFB communication, while the primary MME will still function as the MME for the UE for other purposes such as managing bearer connections, paging the UE, and receiving and recording tracking area updates, and the like. For instance, when the UE served by the LTE network seeks to place a PSTN call and sends to the eNodeB an extended call origination message, the eNodeB may transmit that call origination message to the secondary MME rather than to the primary MME, and the secondary MME may engage in signaling with the IWS and thus with the CDMA RAN to set up the voice call. But the primary MME may maintain profile and context records for the UE, continue to manage bearer connections for the UE such as signaling with the eNodeB and SGW to set up any new bearers for the UE or to suspend, resume, or release bearers that were established for the UE and receive, and process tracking area updates for the UE.

Handling of incoming CSFB calls, on the other hand, raises another issue. As noted above, when the primary MME handles CSFB registration and/or other CSFB signaling for a UE, the IWS may record that the primary MME is the signaling controller for the UE so that the IWS can determine where to route CSFB signaling for the UE, such as page messages for setup of incoming PSTN voice calls. Advantageously, when the secondary MME operates to set up an outgoing CSFB call for a UE, the IWS may update its mapping to record that the secondary MME, rather than the primary MME, is now the signaling controller for the UE. Thus, when the CDMA RAN has an incoming PSTN call to connect to the UE, the IWS may appropriately route a page message for the call over the working S102 interface to the secondary MME.

As noted above, however, it is the primary MME, rather than the secondary MME, that manages tracking area updates for the UE in the LTE network and thus has the information necessary to facilitate paging of the UE in the tracking area where the UE is located. Thus, when the secondary MME receives from the IWS a page message destined to the UE, the secondary MME may be unable to efficiently forward that page message to the UE.

To address this issue, the secondary MME may itself maintain a record of the primary MME that serves the UE (such as in a table that maps various UEs with various primary MMEs). When the secondary MME receives from the IWS a CSFB page for the UE, the secondary MME may thus determine from that record the primary MME that functions as signaling controller for the UE and may route the page to that primary MME over an S10 interface, and the primary MME may transmit the page to the UE as normal. A page response or other response from the UE may then flow similarly through the primary MME to the secondary MME, to the IWS.

Furthermore, in a scenario where the UE has not yet placed an outgoing CSFB call with signaling through the secondary MME, an additional issue arises, as the IWS may have no record that the secondary MME is now functioning as CSFB signaling controller for the UE, and so the IWS may be unable to route CSFB signaling for an incoming CSFB call to the UE. To overcome this additional issue, each MME of the pool 24, when engaging in signaling with the IWS in normal practice, may include a signaling information element that identifies the pool 24 of which it is a member, and the IWS may programmatically store a record of the MMEs that are a member of that pool. In practice, the IWS may then be the entity that detects failure of the S102 interface with a particular MME such as the primary MME 26 and may responsively direct any signaling for incoming CSFB calls to another MME of the pool 24 with a directive for that MME to pass the signaling along to the primary MME. Thus, when a need arises to page a UE for an incoming CSFB call and the S102 interface between the UE's primary MME and the IWS has failed, the IWS may still pass a page message for that call to the primary MME, through a secondary MME.

Figure 2:
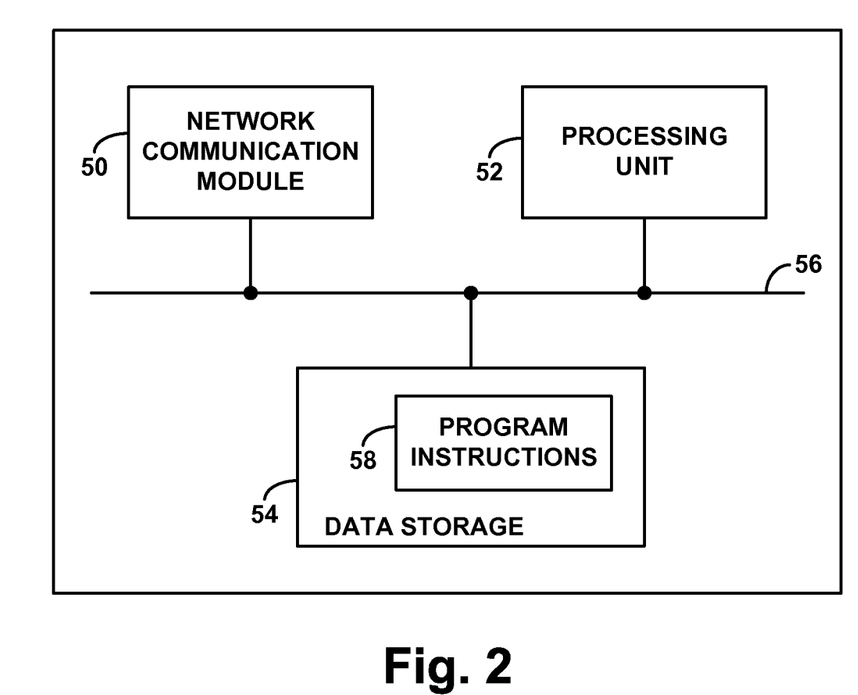
FIG. 2 is a simplified block diagram of a representative network node operable within the arrangement of FIG. 1.

FIG. 2 is next a simplified block diagram of a representative network node operable within the arrangement of FIG. 1. This block diagram may represent components of an eNodeB, MME, IWS, MSC, or other entity. As shown, the node includes a network communication module 50, a processing unit 52, and data storage 54, all of which may be integrated together or communicatively linked together by a system bus, network, or other connection mechanism 56.

The network communication module 50 may facilitate wired and/or wireless communication with various other entities. For instance, in a base station, the network communication module 50 may include the antenna structure and associated equipment noted above for communicating over the air with UEs and may further include an Ethernet interface or other module for coupling with a wireless carrier's core network so as to communicate with other entities such as a RAN controller and a switch or gateway for example. In an MME, IWS, or other RAN entity, on the other hand, the network communication module 50 may be an Ethernet interface or other module for coupling with the core network so as to communicate with other entities such as various base stations and gateways for example.

The processing unit 52 may then comprise one or more general purpose processors (e.g., microprocessors) and/or one or more special purpose processors (such as application specific integrated circuits and/or digital signal processing units) and may be integrated in whole or in part with the network communication module. Further, the data storage 54 may include one or more volatile and/or non-volatile storage components, such as magnetic, optical, or flash storage, and may be integrated in whole or in part with the processing unit. As shown, the data storage 54 may hold program instructions 58 executable by the processing unit 52 to carry out various functions described herein.

Figure 3:
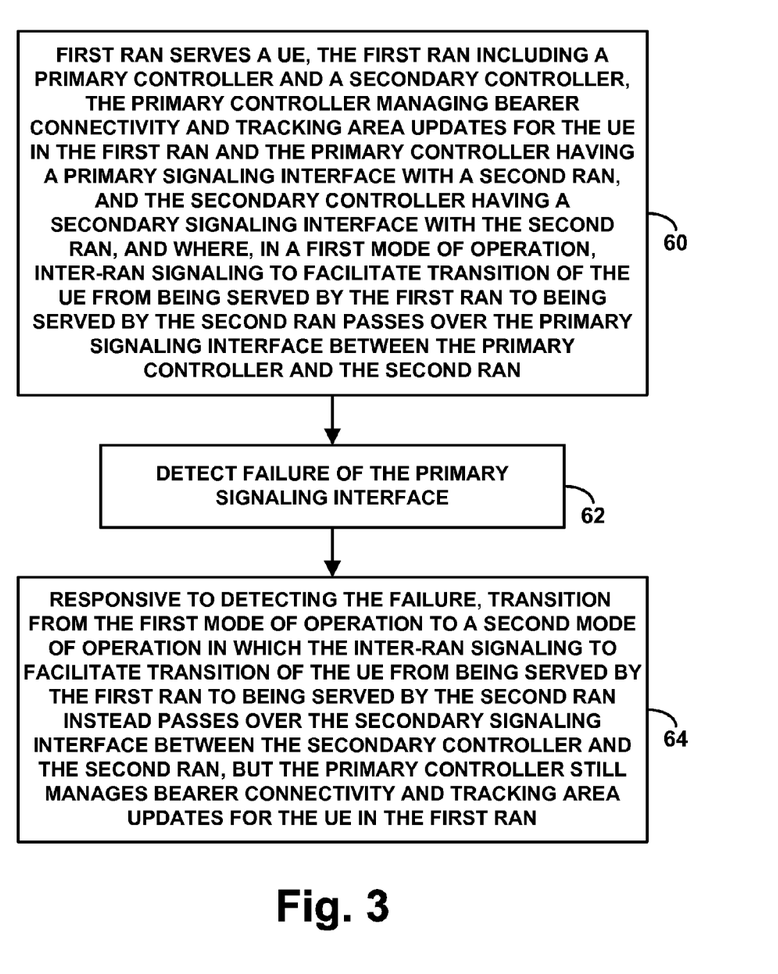
FIG. 3 is a flow chart depicting functions that can be carried out in accordance with the disclosure.

FIG. 3 is next a flow chart depicting functions that can be carried out in accordance with an example implementation of the present method. As shown in FIG. 3, at block 60, the method involves a first RAN serving a UE, where the first RAN includes a primary controller and a secondary controller, where the primary controller manages bearer connectivity and tracking area updates for the UE in the first RAN and the primary controller has a primary signaling interface with a second RAN, and where the secondary controller has a secondary signaling interface with the second RAN, and where, in a first mode of operation, inter-RAN signaling to facilitate transition of the UE from being served by the first RAN to being served by the second RAN passes over the primary signaling interface between the primary controller and the second RAN.

At block 62, the method then involves detecting failure of the primary signaling interface. And at block 64, the method involves, responsive to detecting the failure, transitioning from the first mode of operation to a second mode of operation in which the inter-RAN signaling to facilitate transition of the UE from being served by the first RAN to being served by the second RAN instead passes over the secondary signaling interface between the secondary controller and the second RAN, but the primary controller still manages bearer connectivity and tracking area updates for the UE in the first RAN.

In line with the discussion above, the act of detecting the failure of the primary signaling interface may involve the primary controller detecting the failure of the primary signaling interface. Further, the act of transitioning from the first mode of operation to the second mode of operation may involve the primary controller signaling to base station serving the UE to cause the base station (i) to send to the primary controller any signaling from the UE related to bearer connectivity or tracking area update and (ii) to send to the secondary controller any inter-RAN signaling from the UE related to transition of the UE from being served by the first RAN to being served by the second RAN.

Alternatively, also in line with the discussion above, in a scenario where the primary and secondary signaling interfaces link with an IWS that is in communication with a controller of the second RAN, the act of detecting the failure of the primary signaling interface may involve the IWS detecting the failure. Further, the act of transitioning from the first mode of operation to the second mode of operation may then involve the IWS transitioning from communication of the inter-RAN signaling with the primary controller to communication of the inter-RAN signaling with the secondary controller.

In practice, after transitioning to the second mode of operation, the IWS may then receive from the controller of the second RAN a page message for transmission to the UE to page the UE for a call to be served to the UE by the second RAN. And the IWS may forward the page message to the secondary controller over the secondary signaling interface, the secondary controller may forward the page message over an inter-controller interface to the primary controller, and the primary controller may then transmit the page message (via a base station) to the UE.

Figure 4:
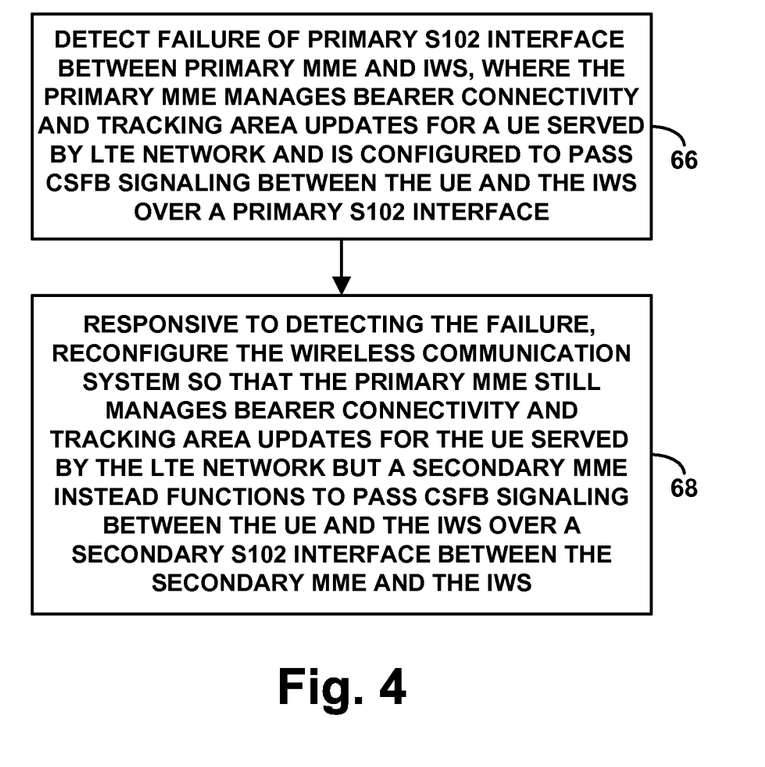
FIG. 4 is another flow chart depicting functions that can be carried out in accordance with the disclosure.

FIG. 4 is next another flow chart depicting functions that can be carried out in accordance with an example implementation of the present method, specifically in a wireless communication system including an LTE network having a primary MME that manages bearer connectivity and tracking area updates for a UE served by the LTE network and that functions to pass CSFB signaling between the UE and an IWS of a fallback network over a primary S102 interface between the primary MME and the IWS. As shown in FIG. 4, at block 66, the method involves detecting failure of the primary S102 interface. And at block 68, the method involves, responsive to detecting the failure, reconfiguring the wireless communication system so that the primary MME still manages bearer connectivity and tracking area updates for the UE served by the LTE network but a secondary MME instead functions to pass CSFB signaling between the UE and the IWS over a secondary S102 interface between the secondary MME and the IWS.

Here, the act of reconfiguring the wireless communication system may involve reconfiguring an LTE eNodeB that serves the UE, (i) to pass to the primary MME any signaling from the UE related to bearer connectivity or tracking area update but (ii) to pass to the secondary MME, instead of the primary MME, any signaling from the UE related to CSFB. For instance, the primary MME may direct the eNodeB to operate in that manner and may further engage in signaling with the secondary MME.

Thus, in an arrangement where the RAN is normally configured to have the primary MME communicate with the fallback network, over the primary S102 interface, communication-setup signaling that is passing between the fallback network and the UE served by the LTE network in preparation for transition of the UE from being served by the LTE network to being served with a communication by the fallback network, this reconfiguration may help overcome a failure of that primary S102 interface. In particular, the LTE network would be reconfigured (i) to have the secondary MME communicate the communication-setup signaling over the secondary S102 interface with the fallback network, instead of having the primary MME communicate the communication-setup signaling over the primary S102 interface with the fallback network, but (ii) to have the primary MME continue to manage bearer connectivity and tracking area updates in the LTE network for the UE served by the LTE network.

For instance, this reconfiguration of the LTE network may involve reconfiguring the eNodeB (a) to pass to the secondary MME, instead of to the primary MME, any instances of the communication-setup signaling received from the UE for the secondary MME to pass over the secondary S102 interface to the fallback network, but (b) to pass to the primary MME any instances of signaling received from the UE related to bearer connectivity and tracking area updates in the LTE network. More specifically, the primary MME may transmit to the eNodeB a reconfiguration directive to which the base station is configured to respond by changing operational state of the base station in accordance with the reconfiguration directive.

Further, the reconfiguration of the LTE network may also involve providing the secondary MME with notification that the UE is authenticated, so as to avoid having the secondary MME require the UE to re-attach to the LTE network in response to the secondary MME receiving any instances of the communication-setup signaling. For instance, this may involve the primary MME providing such notification to the secondary MME directly, or by transmitting the notification over an S1-MME interface to the eNodeB so as to cause the eNodeB to transmit the notification in turn over an S1-MME interface to the secondary MME.

Moreover, in the reconfigured state of the LTE network, the secondary MME may be arranged to receive instances of the communication-setup signaling over the secondary S102 interface from the fallback network and to pass the received instances of the communication-setup signaling to the primary MME for transmission to the UE.

Exemplary embodiments have been described above. Those skilled in the art will understand, however, that changes and modifications may be made to these embodiments without departing from the true scope and spirit of the invention.

We claim:

1. A method comprising:
a first radio access network (RAN) serving a user equipment device (UE), wherein the first RAN includes a primary controller and a secondary controller, wherein the primary controller manages bearer connectivity and tracking area updates for the UE in the first RAN and the primary controller has a primary signaling interface with a second RAN, and wherein the secondary controller has a secondary signaling interface with the second RAN, wherein in a first mode of operation, inter-RAN signaling to facilitate transition of the UE from being served by the first RAN to being served by the second RAN passes over the primary signaling interface between the primary controller and the second RAN;
detecting failure of the primary signaling interface; and
responsive to detecting the failure, transitioning from the first mode of operation to a second mode of operation in which the inter-RAN signaling to facilitate transition of the UE from being served by the first RAN to being served by the second RAN instead passes over the secondary signaling interface between the secondary controller and the second RAN, and in which the primary controller still manages bearer connectivity and tracking area updates for the UE in the first RAN.

2. The method of claim 1,
wherein the first RAN includes a base station serving the UE,
wherein detecting the failure of the primary signaling interface comprises the primary controller detecting the failure of the primary signaling interface, and
wherein transitioning from the first mode of operation to the second mode of operation comprises the primary controller signaling to the base station to cause the base station (i) to send to the primary controller any signaling from the UE related to bearer connectivity or tracking area update and (ii) to send to the secondary controller any inter-RAN signaling from the UE related to transition of the UE from being served by the first RAN to being served by the second RAN.

3. The method of claim 1,
wherein the primary signaling interface communicatively links the primary controller with an interworking server (IWS) that is in communication with a controller of the second RAN, and wherein the secondary signaling interface communicatively links the secondary controller with the IWS as well,
wherein detecting the failure of the primary signaling interface comprises the IWS detecting the failure, and
wherein transitioning from the first mode of operation to the second mode of operation comprises the IWS transitioning from communication of the inter-RAN signaling with the primary controller to communication of the inter-RAN signaling with the secondary controller.

4. The method of claim 1,
wherein the primary signaling interface communicatively links the primary controller with an interworking server (IWS) that is in communication with a controller of the second RAN, and wherein the secondary signaling interface communicatively links the secondary controller with the IWS as well, the method further comprising:
after transitioning to the second mode of operation, the IWS receiving from the controller of the second RAN a page message for transmission to the UE to page the UE for a call to be served to the UE by the second RAN;
the IWS forwarding the page message to the secondary controller over the secondary signaling interface;
the secondary controller forwarding the page message over an inter-controller interface to the primary controller; and
the primary controller transmitting the page message to the UE.

5. The method of claim 1, wherein the first RAN is a Long Term Evolution (LTE) RAN, wherein the primary controller is a primary mobility management entity (MME), wherein the secondary controller is a secondary MME, and wherein the communication-setup signaling is signaling to set up circuit switched fallback (CSFB) communication for the UE.

6. The method of claim 5, wherein the primary MME and secondary MME are in a common pool of MMEs, the method further comprising:
responsive to detecting the failure, selecting the secondary MME from the pool, and then transitioning to the second mode of operation.

7. The method of claim 6, further comprising determining whether the secondary signaling interface is working before transitioning to the second mode of operation.

8. A first radio access network (RAN) comprising:
a primary controller configured to manage bearer connectivity and tracking area updates in the first RAN for a user equipment device (UE) served by the first RAN, the primary controller having a primary signaling interface with a second RAN, wherein the first RAN is configured to have the primary controller communicate with the second RAN, over the primary signaling interface, communication-setup signaling that is passing between the second RAN and the UE served by the first RAN in preparation for transition of the UE from being served by the first RAN to being served with a communication by the second RAN; and
a secondary controller having a secondary signaling interface with the second RAN,
wherein the primary controller is further configured to detect failure of the primary signaling interface and, in response to detecting the failure, to reconfigure the first RAN to have the secondary controller communicate the communication-setup signaling over the secondary signaling interface with the second RAN, instead of having the primary controller communicate the communication-setup signaling over the primary signaling interface with the second RAN, while the primary controller continues to manage bearer connectivity and tracking area updates in the first RAN for the UE served by the first RAN.

9. The first RAN of claim 8, wherein the first RAN is a Long Term Evolution (LTE) RAN, wherein the primary controller is a primary mobility management entity (MME), wherein the secondary controller is a secondary MME, and wherein the communication-setup signaling is signaling to set up circuit switched fallback (CSFB) communication for the UE.

10. The first RAN of claim 8, further comprising:
a base station serving the UE, wherein the base station is configured to receive from the UE signaling, including instances of the communication-setup signaling and instances of signaling related to bearer connectivity and tracking area updates in the first RAN, and to pass the received signaling to the primary controller,
wherein reconfiguring the first RAN to have the secondary controller communicate the communication-setup signaling over the secondary signaling interface with the second RAN instead of having the primary controller communicate the communication-setup signaling over the primary signaling interface with the second RAN, while the primary controller continues to manage bearer connectivity and tracking area updates in the first RAN for the UE served by the first RAN, comprises reconfiguring the base station (i) to pass to the secondary controller, instead of to the primary controller, any instances of the communication-setup signaling received from the UE for the secondary controller to pass over the secondary signaling interface to the second RAN, and (ii) to pass to the primary controller any instances of signaling received from the UE related to bearer connectivity and tracking area updates in the first RAN.

11. The first RAN of claim 10, wherein reconfiguring the base station comprises the primary controller transmitting to the base station a reconfiguration directive to which the base station is configured to respond by changing operational state of the base station in accordance with the reconfiguration directive.

12. The first RAN of claim 10, wherein reconfiguring the first RAN to have the secondary controller communicate the communication-setup signaling over the secondary signaling interface with the second RAN instead of having the primary controller communicate the communication-setup signaling over the primary signaling interface with the second RAN, while the primary controller continues to manage bearer connectivity and tracking area updates in the first RAN for the UE served by the first RAN, further comprises:
providing the secondary controller with notification that the UE is authenticated, so as to avoid having the secondary controller require the UE to re-attach to the first RAN in response to the secondary controller receiving any instances of the communication-setup signaling.

13. The first RAN of claim 12, wherein providing the secondary controller with the notification comprises transmitting the notification over a communication interface from the primary controller to the secondary controller.

14. The first RAN of claim 12, wherein providing the secondary controller with the notification comprises transmitting the notification over a communication interface from the primary controller to the base station for the base station to transmit in turn over an interface from the base station to the secondary controller.

15. The first RAN of claim 8, wherein, once the first RAN is reconfigured, the secondary controller is configured to receive instances of the communication-setup signaling over the secondary signaling interface from the second RAN and to pass the received instances of the communication-setup signaling to the primary controller for transmission to the UE.

16. The first RAN of claim 8, wherein the primary controller and secondary controller are in a common pool of controllers for the first RAN, and wherein the primary controller is further configured to select the secondary controller from the pool in response to detecting the failure of the primary signaling interface.

17. The first RAN of claim 8, wherein the primary controller is further configured to query the secondary controller to verify that the secondary signaling interface is working before reconfiguring the first RAN to have the secondary controller communicate the communication-setup signaling over the secondary signaling interface with the second RAN instead of having the primary controller communicate the communication-setup signaling over the primary signaling interface with the second RAN.

18. The first RAN of claim 8,
wherein the primary signaling interface with the second RAN is a primary signaling interface with an interworking server (IWS), the IWS functioning as a signaling proxy between the first RAN and a controller of the second RAN, and wherein the secondary signaling interface with the second RAN is a secondary signaling interface with the IWS.

19. A method in a wireless communication system including a Long Term Evolution (LTE) network having a primary mobility management entity (MME) that manages bearer connectivity and tracking area updates for a user equipment device (UE) served by the LTE network and that functions to pass circuit-switched fallback (CSFB) signaling between the UE and an interworking server (IWS) of a fallback network over a primary S102 interface between the primary MME and the IWS, the method comprising:

detecting failure of the primary S102 interface; and responsive to detecting the failure, reconfiguring the wireless communication system so that the primary MME still manages bearer connectivity and tracking area updates for the UE served by the LTE network and a secondary MME instead functions to pass CSFB signaling between the UE and the IWS over a secondary S102 interface between the secondary MME and the IWS.

20. The method of claim 19, wherein an eNodeB of the LTE network serves the UE, and wherein reconfiguring the wireless communication system comprises:

reconfiguring the eNodeB (i) to pass to the primary MME any signaling from the UE related to bearer connectivity or tracking area update and (ii) to pass to the secondary MME any signaling from the UE related to CSFB.

* * * * *